United States Patent
Babbidge et al.

(10) Patent No.: US 9,722,999 B2
(45) Date of Patent: Aug. 1, 2017

(54) SECURE ACCESS TO SECURE ACCESS MODULE-ENABLED MACHINE USING PERSONAL SECURITY DEVICE

(71) Applicant: Assa Abloy AB, Stockholm (SE)

(72) Inventors: John Babbidge, Alameda, CA (US); François-Eric Michel Guyomarc'h, Clermont I'Herault (FR)

(73) Assignee: Assa Abloy AB, Stockholm (SE)

( * ) Notice: Subject to any disclaimer, the term of this patent is extended or adjusted under 35 U.S.C. 154(b) by 0 days.

(21) Appl. No.: 14/769,865

(22) PCT Filed: Feb. 24, 2014

(86) PCT No.: PCT/US2014/017933
§ 371 (c)(1),
(2) Date: Aug. 24, 2015

(87) PCT Pub. No.: WO2014/130920
PCT Pub. Date: Aug. 28, 2014

(65) Prior Publication Data
US 2016/0014116 A1 Jan. 14, 2016

Related U.S. Application Data

(60) Provisional application No. 61/768,919, filed on Feb. 25, 2013.

(51) Int. Cl.
*H04L 29/06* (2006.01)
*G06F 21/41* (2013.01)
*G06F 21/35* (2013.01)

(52) U.S. Cl.
CPC .......... *H04L 63/0838* (2013.01); *G06F 21/35* (2013.01); *G06F 21/41* (2013.01)

(58) Field of Classification Search
USPC ........................................................ 726/6, 7
See application file for complete search history.

(56) References Cited

U.S. PATENT DOCUMENTS 6,490,687 B1 12/2002 Nagai
H2270 H 6/2012 LeSaint et al.
(Continued)

OTHER PUBLICATIONS http://www.merriam-webster.com/dictionary/mechanism; Sep. 13, 2016; 4 pages.*

(Continued)

*Primary Examiner* — Jason Lee
(74) *Attorney, Agent, or Firm* — Muirhead and Saturnelli, LLC

(57) ABSTRACT

A system and method are provided to access a secure host device using a personal security device (PSD). A user's PSD may hold a credential of a requesting component of the secure host device. The credential may only be readable from the PSD when a secure channel is established therewith. The establishment of a secure channel with the PSD may require access to keys. The secure host device may contain a SAM capable of securely storing and operating keys. The SMA may contain the relevant keys to support establishment of a secure channel with the personal security device and release a credential to its requesting component. These criteria may achieve the secure release of the credential from the PSD to the requesting component of the secure host device to achieve access by the user when the PSD is presented in the non-contract field of a card reader monitored by the secure host device.

16 Claims, 13 Drawing Sheets

(56) References Cited

U.S. PATENT DOCUMENTS

| | | | |
|---|---|---|---|
| 2003/0005193 A1 | 1/2003 | Seroussi et al. | |
| 2003/0028814 A1 | 2/2003 | Carta et al. | |
| 2007/0023508 A1 | 2/2007 | Brookner | |
| 2011/0265151 A1 | 10/2011 | Furlan et al. | |
| 2012/0137128 A1* | 5/2012 | Buer | H04L 9/3271 713/156 |
| 2012/0144193 A1* | 6/2012 | Le Saint | H04L 9/3234 713/168 |
| 2012/0192260 A1 | 7/2012 | Kontsevich | |
| 2012/0252405 A1* | 10/2012 | Lortz | G06F 8/60 455/410 |

OTHER PUBLICATIONS

Karger, Paul A., "Privacy and Security Threat Analysis of the Federal Employee Personal Identity Verification (PIV) Program", Symposium on Usable Privacy and Security (SOUPS), Jul. 12-14, 2006, 8pps., XP002516335.

Gallagher, Patrick D., "FIPS PUB 201-2 3 4 5 Federal Information Processing Standards Publication, Personal Identity Verification (PIV) Federal Employees and Contractors, Revised Draft 33 34", Jul. 31, 2012, 94 pps., XP055299405.

\* cited by examiner

SECURE ACCESS TO SECURE ACCESS MODULE-ENABLED MACHINE USING PERSONAL SECURITY DEVICE

RELATED APPLICATIONS

This application claims priority to U.S. Prov. App. No. 61/768,919, filed Feb. 25, 2013, which is incorporated herein by reference.

TECHNICAL FIELD

This application is related to the field of credential management and usage with a personal security device.

BACKGROUND OF THE INVENTION

Personal Security Devices (PSDs), for example, smart cards, tags, wearables, mobile terminals (e.g., tablet devices, mobile phones and/or other smart device) and/or any appropriate security-capable personal device, may use a process where information and programs necessary to use the PSD are loaded therein. The information may include an initial security mechanism (SM) that may be used to access the PSD and/or may allow the PSD to be used for secure transactions. The information may also include applications that facilitate the SM provided by the PSD (e.g., a program to facilitate door access may include a specific door access security mechanism). In some cases, the information may be downloaded by a manufacturer prior to distribution, while in other cases, information for managing the PSD may be securely downloaded over a network to the PSD. For detailed discussions of features and operations of personal security devices, reference is made, for example, to U.S. Pat. No. 8,028,083 B2 to Audebert et al., issued Sep. 27, 2011, entitled "Method and System for Remote Activation and Management of Personal Security Devices," that discloses features of remote activation and management of PSDs over a network for obtaining services of data from a remote computer system, and to WO 2013/144719 A1 to Sechdeva et al., published Mar. 26, 2013, entitled "Field Revisions for a Personal Security Device," providing disclosure for management and establishment of security mechanisms and key material in issued personal security devices in a field environment, both of which are incorporated herein by reference.

Accordingly, it would be desirable to provide advantageous mechanisms and techniques that enable and facilitate the access by a personal security device to a secured machine or device.

SUMMARY OF THE INVENTION

According to the system described herein, a method for accessing a secure host device using a personal security device (PSD) of a user includes providing the PSD with a credential for accessing the secure host device, wherein the credential is only readable from or operable with the PSD when a secure channel is established between the PSD and the secure host device after presenting the PSD in a non-contact field of a reader monitored by the secure host device. The secure channel is established with the PSD using keys stored and operated on the secure host device. The credential of the PSD is securely released to a requesting component of the secure host device to achieve access by the user to the secure host device when the PSD is presented in the non-contact field. The requesting component may be an operating system (OS) of the secure host device, and the credential may be an OS credential. The requesting component may be an application running on the secure host device. The credential may be a one-time password, and the PSD may be a smart card, a tag, a wearable and/or a mobile terminal. The secure host device may include a secure access module (SAM), and the SAM may run on dedicated secure hardware of the secure host device and/or a main processor of the secure host device. Establishing the secure channel may be performed in a tethered mode of operation and/or a roaming mode of operation, in which, for the tethered mode of operation, the PSD releases the credential to the secure host device only when the PSD is cryptographically bound to the secure host device, and, in which, for the roaming mode of operation, the PSD releases the OS credential to any secure host device activated for a specific group of PSDs. The method may further include binding the PSD to the user to provide two factor authentication.

According further to the system described herein, a non-transitory computer readable medium stores software for accessing a secure host device using a personal security device (PSD) of a user. The software may include executable code that stores on the personal security device a credential for accessing the secure host device, wherein the credential is only readable from or operable with the PSD when a secure channel is established between the PSD and the secure host device after presenting the PSD in a non-contact field of a reader monitored by the secure host device. Executable code is provided that establishes the secure channel with the PSD using keys stored and operated on the secure host device. Executable code is provided that securely releases the credential of the PSD to a requesting component of the secure host device to achieve access by the user to the secure host device when the PSD is presented in the non-contact field. The requesting component may be an operating system (OS) of the secure host device, and the credential may be an OS credential. The requesting component may be an application running on the secure host device. The credential may be a one-time password, and the PSD may be a smart card, a tag, a wearable and/or a mobile terminal. The secure host device may include a secure access module (SAM), and the SAM may run on dedicated secure hardware of the secure host device and/or a main processor of the secure host device. The executable code that establishes the secure channel may include executable code that provides a tethered mode of operation and/or executable code that provides a roaming mode of operation. For the tethered mode of operation, the PSD releases the credential to the secure host device only when the PSD is cryptographically bound to the secure host device. For the roaming mode of operation, the PSD releases the OS credential to any secure host device activated for a specific group of PSDs. Executable code may be provided that binds the PSD to the user using a personal identification number (PIN) to provide two factor authentication.

According further to the system described herein, a mechanism is provided for accessing a secure host device using a personal security device (PSD) of a user. The mechanism includes a non-contact field reader monitored by the secure host device and at least one processor that reads software stored on at least one computer readable medium. The software may include executable code that stores on the personal security device a credential for accessing the secure host device, wherein the credential is only readable from or operable within the PSD when a secure channel is established between the PSD and the secure host device after presenting the PSD in a non-contact field of a reader monitored by the secure host device. Executable code is provided that establishes the secure channel with the PSD using keys stored and operated on the secure host device. Executable code is provided that securely releases the credential of the PSD to a requesting component of the secure host device to achieve access by the user to the secure host device when the PSD is presented in the non-contact field. The requesting component may be an operating system (OS) of the secure host device, and the credential may be an OS credential. The requesting component may be an application running on the secure host device. The credential may be a one-time password, and the PSD may be a smart card, a tag, a wearable and/or a mobile terminal. The secure host device may include a secure access module (SAM), and the SAM may run on dedicated secure hardware of the secure host device and/or a main processor of the secure host device. The executable code that establishes the secure channel may include executable code that provides a tethered mode of operation and/or executable code that provides a roaming mode of operation. For the tethered mode of operation, the PSD releases the credential to the secure host device only when the PSD is cryptographically bound to the secure host device. For the roaming mode of operation, the PSD releases the OS credential to any secure host device activated for a specific group of PSDs. Executable code may be provided that binds the PSD to the user using a personal identification number (PIN) to provide two factor authentication.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
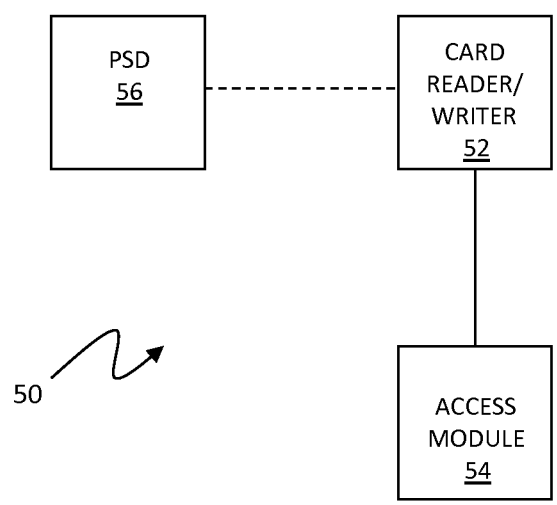
FIG. 1 is a schematic illustration showing an access module, a card reader/writer, and a PSD that may be used in accordance with an embodiment of the system described herein.

FIG. 1 is a schematic illustration of a system 50 having a card reader/writer 52, an access module 54, and a PSD 56. In various embodiments herein, the PSD 56 may be a smart card and/or may be embedded in, or part of, a mobile terminal, such as a mobile phone, tablet device and/or other smart terminal. In some embodiments, the system described herein may be used with a virtual implementation of a PSD running on a main processor of a mobile terminal, such as a mobile phone and/or other mobile device. Types of security tokens that may also be used with the system described herein include an integrated circuit card, a subscriber identification module (SIM), a wireless identification module (WIM), an identification token, a secure access module (SAM), a hardware security module (HSM), a secure multimedia card (SMMC), a universal serial bus (USB) token, or a similar portable device that may be carried by a user for access. The card reader/writer 52 may be adapted to read from and write to the PSD 56 depending upon how the PSD 56 is implemented.

The access module 54 may be a computing device (e.g., a general purpose programmed computing device, a specialized microprocessor, a SAM etc.) incorporated into a door or door controller for controlling physical access therethrough and/or may be incorporated into desktops, laptops, kiosks and/or mobile platforms for controlling logical and/or physical access to another logical and/or physical entity (e.g., any resource granted to a user once logged on). In various embodiments, the access module 54 may be implemented as software and/or may be implemented using hardware, such as in the form of a SAM, and/or any combination thereof. In some embodiments, the access module 54 may be used for payment transactions, loyalty transactions (e.g., frequent flyer miles, shopping points, etc.), and/or for any type of protected transaction and/or operation.

The access module 54 may be capable of establishing a logical communication channel with the PSD 56 and capable of authenticating to the PSD 56. The card reader/writer 52 may be a general purpose computing device or a specialized device capable of establishing a connection with the PSD 56. In one embodiment, the card reader/writer 52 may be a non-contact field reader that may establish an NFC connection with the PSD 56, although other types of connections are possible such as Bluetooth and Bluetooth Smart. The non-contact field reader may be a separate component or an integral sub-component of a secure host device to which the PSD is accessing. The card reader/writer 52 may be the same device as or may be distinct from the access module 54. The card reader/writer 52 and the access module 54 may be connected using any appropriate means, such as hard wired, WiFi, via the Internet, a private IP network, and/or any other appropriate mechanism for transmitting data therebetween.

The card reader/writer 52 and the access module 54 communicate with the PSD 56 to exchange data therewith as described elsewhere herein. In an embodiment herein, a user presents the PSD 56 to the card reader/writer 52 and is granted or denied access based on the results of applying a security mechanism used by the access module 54 and the PSD 56. In some embodiments, both the PSD 56 and the access module 54 have a shared secret which may be used to authenticate the PSD 56. The term "shared secret" may be understood herein to include symmetric keys and session keys in which each side in a transaction may have the same, or a similarly generated, key that is used for secure communication and authentication. In an embodiment herein, establishing a shared secret may be performed by initially using a public key infrastructure (PKI) key agreement technique such as Diffie-Hellman and/or Elliptic Curve Diffie Hellman (ECDH) along with a public/private key pair of the personal security device 56 and a different public/private key pair of the access module 54. Note that any appropriate technique may be used to establish a shared secret between the PSD 56 and the access module 54, such as RSA key transport, which allows the system on one side to generate a shared secret that is involved in the computation of a session key that is transmitted securely using an authenticated public key bound to a private key of the system on the other side. For discussion techniques for securely exchanging information between a host computer and a cryptographic module, see, for example, U.S. Pat. No. 8,306,228 B2 to Le Saint et al., entitled "Universal Secure Messaging for Cryptographic Modules," which is incorporated by reference herein.

The system described herein may be used in connection with initially using a manufacturer/factory installed security mechanism (SM) to grant access and/or revising the SM and application(s) on the PSD in connection with a use (e.g., the first use). The SM and corresponding application(s) may be modified to be customized SM and corresponding application(s) specifically provided for a specific customer and not generally available to others. Accordingly, in various embodiments, shared secrets may be stored in the PSD at manufacturing time and an access control module obtains the keys either at manufacturing or via a dedicated on line provisioning workflow specific to the type of access control module, for example, according to specific provisioning protocols.

Figure 2:
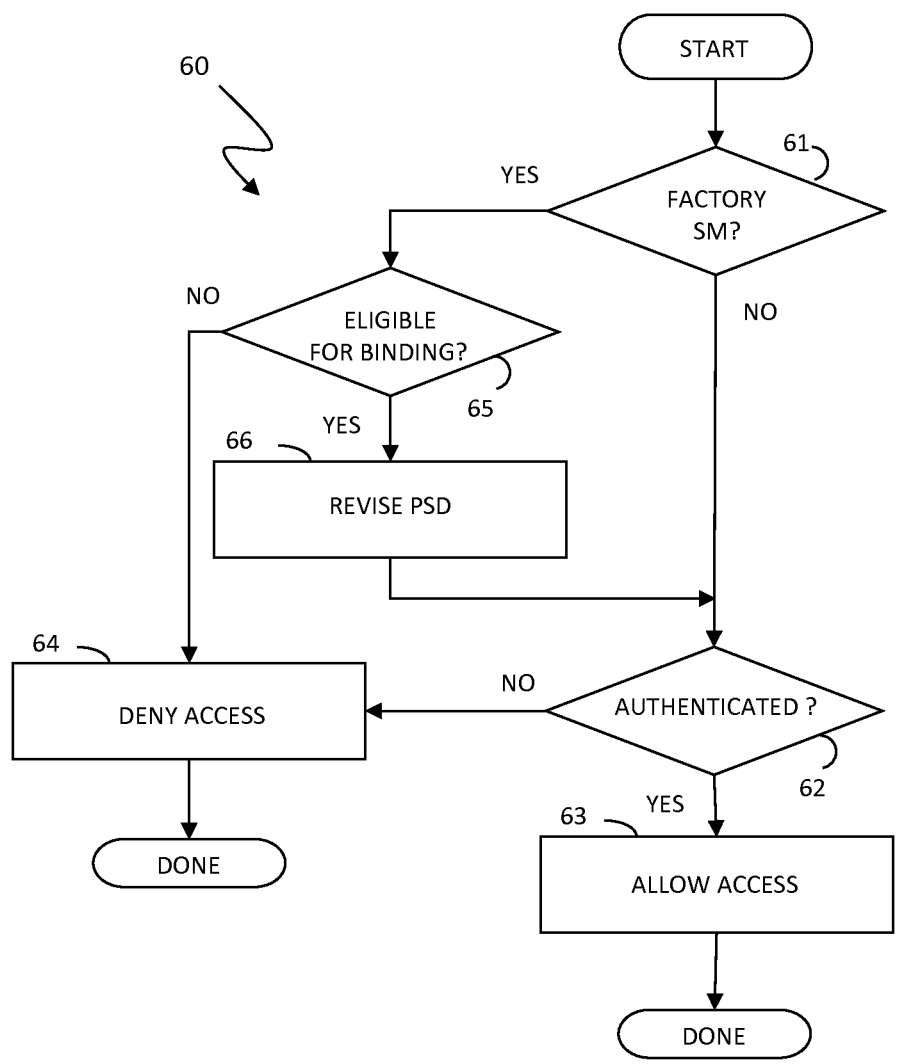
FIG. 2 is a flow diagram illustrating steps performed in connection with authenticating and possibly modifying a PSD according to an embodiment of the system described herein.

FIG. 2 is a flow diagram 60 showing steps performed in connection with the card reader/writer 52 and the access module 54 being presented with the PSD 56 by a user according to the system described herein. Processing begins at a first test step 61 where it is determined if a PSD has a factory SM (i.e., an SM loaded into the PSD by the manufacturer). As discussed elsewhere herein, a customer may receive PSDs with factory SMs and then modify the SMs to be customized customer-specific SMs that may not be generally available to others. If it is determined at the test step 61 that the PSD does not have a factory SM (and thus has a customized SM), then control transfers from the test step 61 to a test step 62 where it is determined if the PSD can be authenticated based on the SM. If so, then control transfers from the test step 62 to a step 63 where access is allowed. Following the step 63, processing is complete. If it is determined at the test step 62 that the PSD cannot be authenticated based on the SM, then control transfers from the test step 62 to a step 64 where access is denied. Following the step 64, processing is complete.

If it is determined at the test step 61 that the PSD contains a factory SM, then control transfers from the test step 61 to a test step 65 where it is determined if the access module 54 has a PSD 56 bound or not. In an embodiment herein, a factory-loaded PSD is modified to contain company-specific or user-specific information the first time the PSD is presented to the access module 54. Thus, a PSD containing factory-loaded information should not be presented to the access module 54 after the a PSD 56 has been bound in which case it is either an error, or perhaps an attempt at fraud. Accordingly, if it is determined at the test step 65 that a PSD has already been bound to the access module 54, then control transfers from the test step 65 to the step 64, discussed above, where access is denied. It is noted that, in another embodiments, a single secure host device may be successfully accessed via multiple PSDs—e.g. a patient record kiosk at a patient's bedside in a hospital, accessed by many healthcare professionals during a day's work. Following the step 64, processing is complete.

If it is determined at the test step 65 that no PSD is bound to the access module 54, then control transfers from the test step 65 to a step 66 where the PSD is revised to contain a new security mechanism. In an embodiment herein, the security mechanisms may be provided by applications loaded into the PSD. Following the step 66, control transfers to the test step 62, discussed above, where the PSD is authenticated. Thus, note that the system described herein revises the security mechanism in the PSD and, in a corresponding transaction, authenticates the PSD. A user could walk up to an access-controlled door with a factory-loaded PSD and be granted access at the same time. The security mechanism is replaced in way that does not adversely impact the user entering the door. In addition, since the replacement occurs in a single step, the likelihood of incomplete or partial replacement is greatly reduced.

Figure 3:
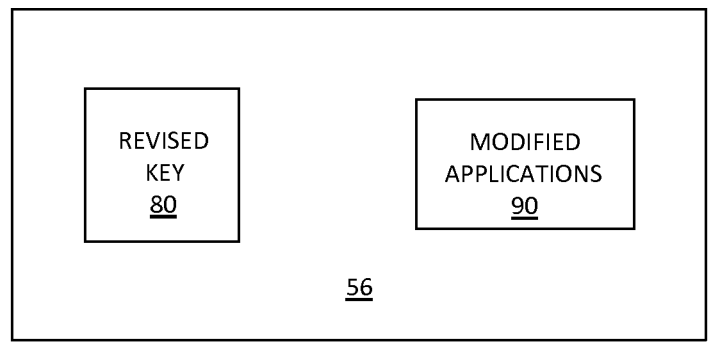
FIG. 3 is a schematic illustration showing a modified PSD according to an embodiment of the system described herein.

FIG. 3 is a schematic illustration showing the PSD 56 as including modified application(s) 90 and possibly a revised key 80. Modifying the application(s) 90 and/or the key 80 provides a custom security mechanism for the PSD 56 so that a malicious user cannot use information from a factory-loaded PSD to circumvent security for a PSD with a custom security mechanism as described herein. The modified application(s) 90 may include any application(s) capable of being provided to the PSD 56.

Figure 4:
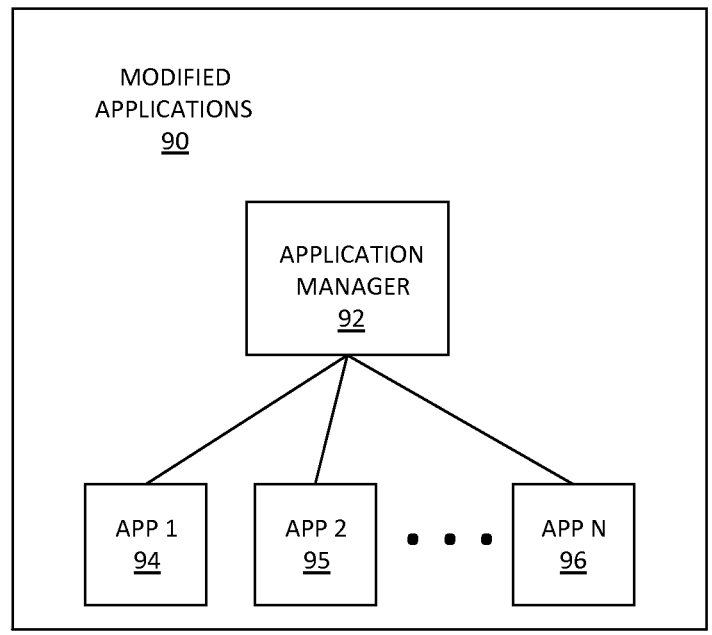
FIG. 4 is a schematic illustration showing modified applications in a PSD according to an embodiment of the system described herein.

FIG. 4 is a schematic illustration showing the modified application(s) 90 in more detail as including an application manager 92 and a plurality of applications 94-96. One or more of the applications 94-96 may provide a security mechanism, such as providing authentication information for access through controlled doors. In an embodiment herein, at least one of the applications 94-96 is modified in connection with a user first using the PSD for access. The modified one of the applications 94-96 provides a different security mechanism that is used for subsequent accesses by the PSD. Multiple application may support multiple security mechanisms protecting multiple credentials.

In an embodiment, Seos card Technology may be used to send commands, such as a single Application Management Request (AMR) command, to the PSD 56. Seos (secure environment operating system) is a system of interoperable products and services, produced by Assa Abloy Ab of Stockholm, Sweden, for issuing, delivering and revoking digital keys/credentials on near field communication (NFC) mobile devices so that they can be used to open doors, for example, to homes, hotels, offices, hospitals, universities, industries and/or commercial buildings. The AMR command, which is described in ISO/IEC 7816-13, provides for replacing or creating a whole application in a single atomic step. The body of the AMR command combines application level data objects together with system objects like application name, access rights and access keys (together forming the basis of security mechanisms) in a single constructed object. Another specific embodiment could include a PSD with generic transaction capability which may be provided, for example, using a Java card. Accordingly, although the system described herein is principally discussed in connection with specific types of PSDs, such as a Seos card, it is noted that the system described herein may be used in connection with any appropriate type of PSD.

In some embodiments, it may be desirable to provide privacy-enhanced discovery, selection and authentication of mobile device credentials from a terminal, reader or authentication server capable of communicating with a mobile device via a NFC, RF or other type of wired or wireless interface. The mobile devices may for example be a contact or contactless smart card, USB token, mobile phone, a Bluetooth or WiFi portable device, PDA or similar devices having wired or wireless connection means to a communicate. The system described herein may be built on the basis of authentication protocols with session key establishment such as an ISO 11770-2 mechanism protocol, other authentication protocols found in ISO 24727-6 registry, GlobalPlatform, or ANSI GICS, and may provide extensions to allow rapid and private discovery of credentials on the mobile device.

The system described herein may be used with a protocol that facilitates confidential discovery and selection of interoperable credentials with privacy, without requiring several separate commands for credential discovery and selection and therefore without requiring significant additional time to conduct the transaction. The privacy-enhanced authentication protocol uses knowledge of a secret to discover access module 54 contexts that the PSD 56 may open or access. Without the possession of the corresponding keys, accessing one credential on the PSD 56 does not breach the privacy of any other credentials on the PSD 56 (including determining if a given credential is or is not on the PSD 56). For further details, reference is made to WO 2013/144719 A1, cited elsewhere herein.

According to the system described herein, in an embodiment, a method may be provided to access (e.g. logon or unlock) a secure host device, such as a PC, laptop, tablet and/or other computing device enabled with a SAM, using a PSD, such as a NFC enabled smart card or mobile phone with an embedded SIM or secure element.

In an embodiment, the system described herein may enable access (e.g., logon or unlock) by a user to a secure host device's operating system (OS) according to the following criteria. A user may have a PSD. The PSD may hold a credential for the OS of the secure host device. The credential may only be readable from or operable with the PSD when a secure channel is established with it. In various embodiments, a secure channel be include an authenticated key establishment protocol to establish session keys for private and authentic exchange of data between the PSD an secure host device, and the secure channel may satisfy certain access conditions on the PSD allowing the reading and/or writing of data from/to the PSD and/or operation of PSD functions. The establishment of a secure channel with the PSD may require access to keys for that PSD. The secure host device may contain a SAM capable of securely storing and operating keys. The SAM may contain the relevant keys to support establishment of a secure channel with the personal security device and release a credential to its OS. The above combined criteria may achieve the secure release of a credential from the PSD to the OS of the secure host device to achieve access when the PSD is presented in the non-contact field of a card reader monitored by the secure host device.

In other embodiments, the secure release of the credential from the PSD may be to an application other than the OS of the secure host device, such as to any appropriate application running on the secure host device that requires authentication (e.g. calling application). Further, the system described herein may be used in connection with static credentials and/or dynamic credentials, such as one-time passwords (OTP). For further discussion of the use of OTPs in an authentication system, reference is made, for example, to U.S. Pub. No. 2009/0193264 A1 to Fedronic et al., entitled "Authentication System and Method," which is incorporated herein by reference. It is noted that, as described herein, securely releasing a credential to the OS (or calling application) of the secure host device should be understood as including release of the credential to the secure host device and/or release of a dynamic output or byproduct from operation of the credential to the secure host device. Thus, in various embodiments, the system described herein may handle scenarios where the token is not powerful enough for, or capable of, processing the operation of the credential onboard, and hence the credentials may be securely released to the custody of the access module (SAM) for secure operation of the credential to generate the dynamic output. After the dynamic output is released to the OS (calling application) of the secure host device, the credential copy in the SAM may be destroyed. Accordingly, the system described herein may operate according to at least the following three cases:

1) a static credential (e.g., OS password) is securely released to the SAM and then released to the calling application (e.g., OS) of the secure host device;

2) a strong authentication credential (e.g., PKI key pair and/or OTP key) is operated within the token and securely releases a dynamic output to the SAM, and is then released to the calling application; and/or 3) a strong authentication credential (e.g., PKI key pair and/or OTP key) is securely released to the SAM, operated within the SAM, and a dynamic output released to the calling application.

In other embodiments, it is further noted that increased security of the system described herein may be achieved by requiring the presence of a specific host. An independent way to increase security is to bind the use of the PSD to a user via a remembered secret (personal identification number (PIN)) and/or using biometrics, for example. Additionally, a PSD may contain multiple credentials for multiple secure host devices each protected by a different secure channel. Further, in another embodiment, multiple credentials may be released for the same host device. For example, one credential may be released for different logical domains to which a user connects from the same host. Further, it is noted that in various embodiments according to the system described herein, credentials may be authenticated by remote systems behind the secure host device, such as authentication servers, VPN servers, primary domain controllers, etc. Additionally, it is noted that personalization of the credential onto the PSD may be from a different client than the secure host device. For example, a server may deliver secured commands to a PSD via a dump proxy/passthrough client.

The system described herein may leverage a client application on the secure host device to interact with the SAM and PSD, collect input from the user as needed, read credential material from PSD, and return credential to secure host device OS to establish a logon session or unlock an existing logon session. In an embodiment, the system described herein may provide for at least two modes of operation: "tethered mode" and "roaming mode." In tethered mode, only PSD(s) explicitly cryptographically bound to a specific secure host device's SAM may release the credential to that specific secure host device's OS. In roaming mode, the PSD may be unbound and able to release the OS credential to any secure host device activated for a specific population of PSDs, and able to consume the OS credential. These modes are further discussed in detail elsewhere herein and it is noted that, for added security, a user-remembered secret (PIN) may be integrated in either mode to add an additional authentication factor.

An activation client is a web delivered client component that may be used to interact with the SAM to achieve activation by delivering the appropriate keys and policy data to the SAM for a specific PSD or a population of PSDs. A usage client is a client component that may be needed for integrating the PSD, SAM, NFC drivers, and user input with the OS logon and/or unlock infrastructure using the NFC driver to detect and communicate with a PSD.

A user's OS credential may be relevant to only a specific secure host device's OS, or in more sophisticated environments, the credential may apply to any secure host device OS connected to a centralized authentication server or domain. In other embodiments, different credentials may be used to connect to different domains or authentication servers from the same host.

Tethered mode provides an opportunity to ensure the user, PSD, and a specific secure host device must be used together to achieve a logon to the targeted secure host device. Activation PSDs for this mode requires activation of both the PSD and the SAM that is in the targeted secure host device.

Roaming mode allows a single user and PSD to logon or unlock various secure host devices, for example a doctor roaming to multiple medial workstations in a hospital, also shared by other doctors each with their own PSD and unique OS credentials. Activation of PSDs for this mode requires activation of the PSD, where the SAM's in a population of secure host devices can be independently activated without prior knowledge of who will be logging on or unlocking the secure host devices.

Activation of a PSD and/or SAM can be achieved in an authorized or anonymous self-service fashion. When authorization is required, a one-time use authentication credential is provided out of band to the user to logon to the Activation Service Portal and activate their secure host device and/or PSD. When authorization is not required (self-service), the Activation Service Portal may be used anonymously by the user to activate their secure host device and/or PSD, where the user supplies an anonymous PSD, the appropriate OS credential, and has access to the secure host device if activation is required. For less rigorous security environments, anonymous self-service activation may be performed offline by the user self-modifying the security mechanism of the PSD, where an unactivated token shares a unsecured factory security mechanism. Furthermore self-service binding may be achieved by the user self-modifying the security mechanism of the SAM.

For tethered mode activation, the user, PSD, SAM, and secure host device are bound together according to the following criteria:
a. The user is bound to the secure host device by knowing the credential for the host OS or an application within to the PSD;
b. The SAM is implicitly bound to the secure host device;
c. The PSD is bound to the SAM by modifying the security mechanism of the SAM such that it is specific to the PSD;
d. The PSD is bound to the secure host device by storing the supplied credential such that it can only be released via the modified security mechanism (secure channel) that the SAM can establish with the keys it possesses;
e. The user is implicitly bound to the PSD via possession or explicitly bound to the PSD by having to present a PIN to the SAM which is used to decrypt the PSD-specific secured channel keys.

When strong user/PSD binding is required to insure that only the legitimate user of the PSD can successfully establish a logon session with the supplied PSD, a user PIN presentation may be required. The use of a PIN may be optional and defined by the security policy. The PIN may be used to either derive a secure channel key from the supplied PIN, or for additional security derive a secure channel key encryption key which is in turn used to encrypt the PSD-specific secure channel key(s). In this second mode, the cipher text is securely stored in the SAM, and may only be unwrapped into key form for use as secure channel key(s) when the PIN is presented to the SAM. This proves the presence of the user, and only enables a secure channel to that user's PSD and only from an authorized secure host device. The OS or application credential may only be accessible after successful PSD secure channel establishment with corresponding PSD-specific key(s). For the self-service form of the tethered mode, if the SAM possesses master secure channel key(s) it can support PSD/SAM binding without Activation Service Portal interaction.

In roaming mode, activation binds the PSD to a credential that is applicable to multiple secure host devices leveraging a centralized user management/authentication paradigm behind the secure host device(s). The roaming mode may be similar to the tethered mode except that the user provisions his PSD once with the OS credential and PIN. Any host with a SAM activated can authorize the user to logon as long as the OS credential is valid. This implies that there is no PSD/SAM binding. That is, the SAM authorizes establishment of a secure channel with any PSD in a specific population without prior registration of the PSD diversification data and PIN to the SAM. The policy to accept any PSD is pushed at SAM activation time. In this mode the access to the OS credential in the PSD remains protected by the PSD's secure channel. To preserve two-factor authentication, a PIN derived key is used to encrypt the OS credential prior to injection into the PSD via the secure channel. In other embodiments, two-factor authentication may be provided using appropriate biometrics, such as human inputs on a mobile phone, e.g. swipes or fingerprint.

For roaming mode activation, the user, PSD, a set of SAMs, and a set of secure host devices are bound together according to the following criteria:
a. The user is bound to a set of secure host devices by supplying the OS, application or centralized user management/authentication credential;
b. Each SAM is implicitly bound to each secure host device;
c. The PSD is bound to a set of SAMs by storing the supplied credential such that it can only be released via a secure channel that SAMs with the master secure channel key(s) can establish;
d. The user is implicitly bound to the PSD via possession or explicitly bound to the PSD by having to present a PIN to the SAM which is used to decrypt the OS, application or centralized user management/authentication credential in the SAM for presentation to the secure host device OS.

When strong user/PSD binding is required to ensure that only the legitimate user of the PSD can successfully establish a logon session with the supplied PSD, a user PIN presentation can be required. The use of a PIN is optional and defined by the security policy. The PIN may be used to derive a credential encryption key from the supplied PIN, which is in turn used to encrypt the secure host device credential prior to storage in the PSD. The ciphertext may be securely stored in the PSD, and may only be decrypted when the PIN is presented to the SAM. This proves the presence of the user, and enables secure host device credential delivery. The secure host device credential may only be accessible after successful PSD secure channel establishment with corresponding PSD-specific key(s).

According to various embodiments, usage of the system described herein may involve the establishment of a secure channel between the PSD and the SAM to release the credential to the OS of the secure host device and/or to an application running on the secure host device that requires authentication. As discussed herein, in various embodiments, the credential may be a static credential and/or may be a dynamic credential, such as a OTP, and may be locally validated by the secure host device.

Figure 5:
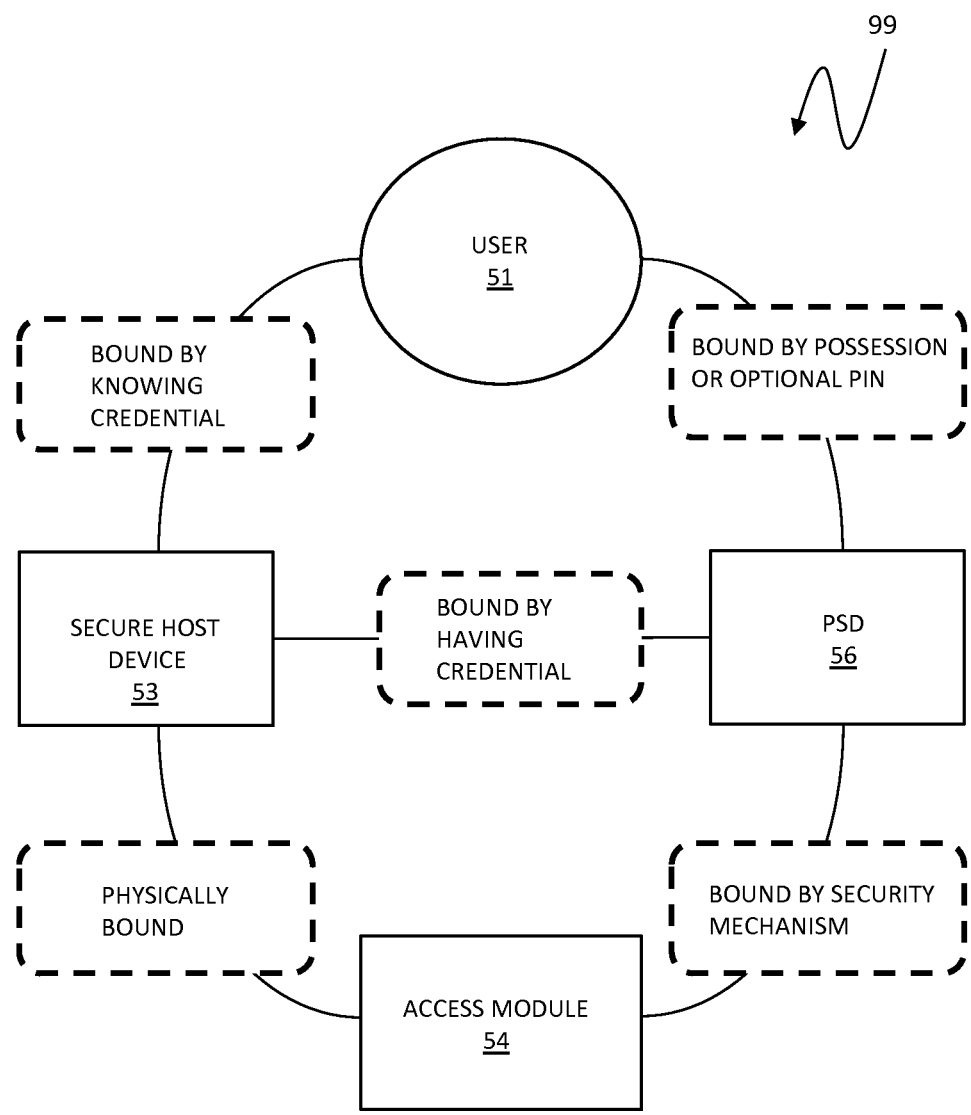
FIG. 5 is a schematic illustration showing a visual representation of the bindings between a user, a secure host device, the access module and the PSD according to the various embodiments discussed herein.

FIG. 5 is a schematic illustration showing a visual representation 99 of the bindings between a user 51, a secure host device 53, the access module 54, such as a SAM, and the PSD 56, according to the various embodiments discussed herein. The user 51 and PSD 56 may be bound by user's possession of the PSD 56 or by an optional PIN or other PSD access control mechanism. The PSD 56 and the access module 54 (SAM) may be bound by a security mechanism, as discussed elsewhere herein. The secure host device 53 and the access module 54 are bound together physically and/or integrally. The secure host device 53 and the user 51 are bound by knowing the credential. The secure host device 53 and the PSD 56 are bound by the secure host device 53 having the credential as according to the features of the system discussed herein.

Figure 6:
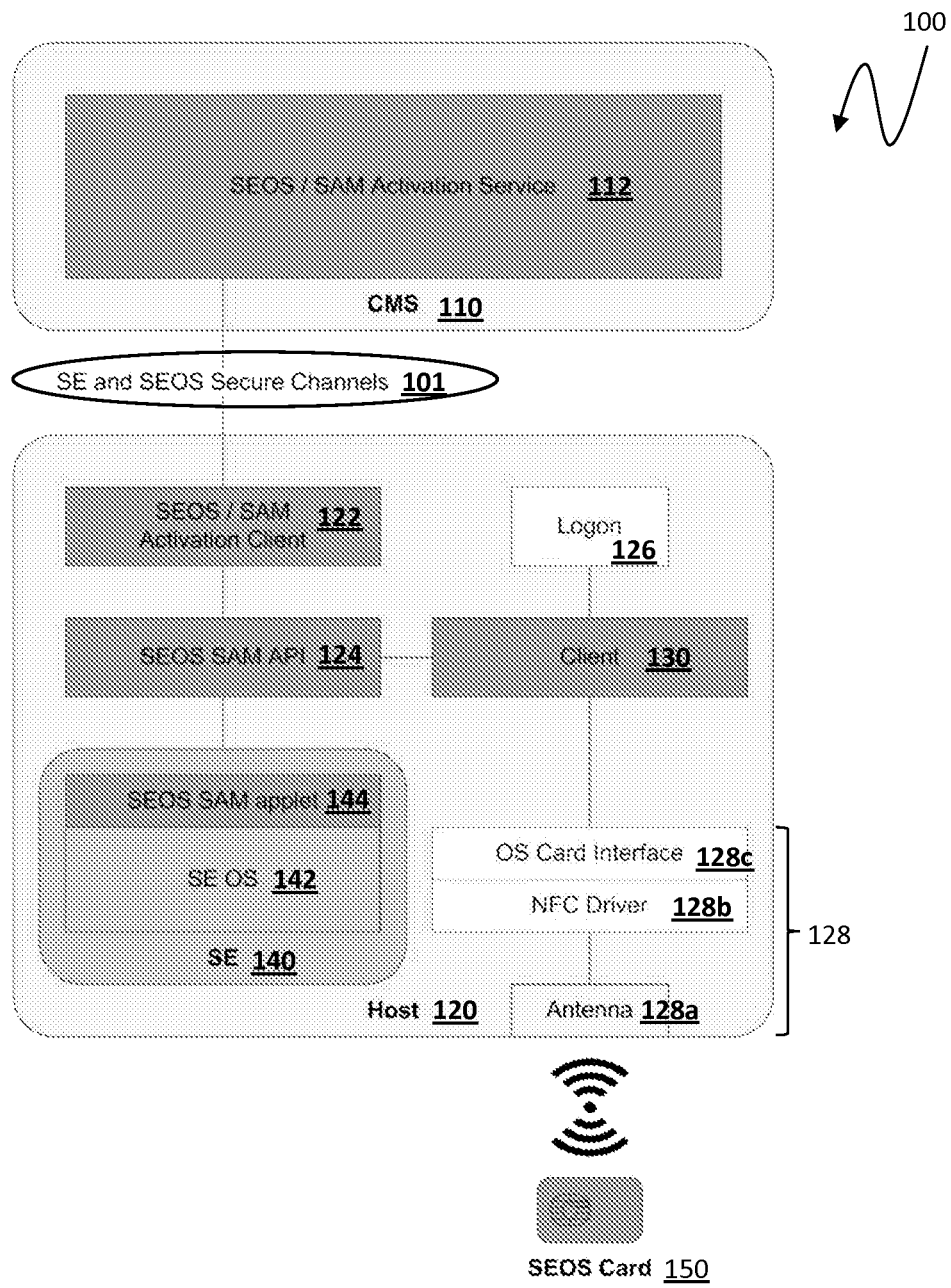
FIG. 6 is a schematic illustration showing an architecture according to an embodiment of the system described herein.

FIG. 6 is a schematic illustration showing an architecture 100 according to an embodiment of the system described herein. A Seos/SAM activation service 112 is running on a Device and Credential Management Server 110 that is operationally connected to a Seos/SAM activation client 122 running on a host 120 through secure channels 101. A Seos/SAM application program interface (API) 124 connects the activation client 122 with a secure environment (SE) 140, on which is running a Seos 142, and also interacts with a client application 130. The activation client 122 may be a web delivered client component that is used to interact with the API 124 during the activation use case. The Seos/SAM API 124 may be used to load a Seos/SAM applet 144 into the SE 140. The API 124 exposes two sets of services: activation services needed to deploy the SAM applet 144, instantiate a SAM instance, and provision Seos keys and data to the SAM instance; and usage services to establish a Seos secure channel with a Seos card 150. The Seos/SAM applet 144 runs on the Seos 142. The SAM applet 144 may be a Java applet or other SE-type applet that implements the services needed for host-side operations of the Seos secure channel 101.

The client application 130 interfaces with functions of the host 120 that may further include logon 126 and communication mechanism(s) 128 that facilitate operations in connection with the SE 140. The communication mechanism 128 shown provides NFC communication using an OS card interface 128c and an NFC driver 128b which operate in connection with an antenna 128a. In other embodiments, it is noted that the interface 128c and NFC 128b may be included inside the SE 140 itself. The antenna 128a communicates wirelessly with NFC devices such as the Seos card 150 and/or other types of PSD. The client application 130 detects the presence of and communicates with the Seos Card 150 via the NFC driver 128b, may interface with the API 124 for Seos secure channel establishment, and may returns credential to the SE OS 142.

Figure 7:
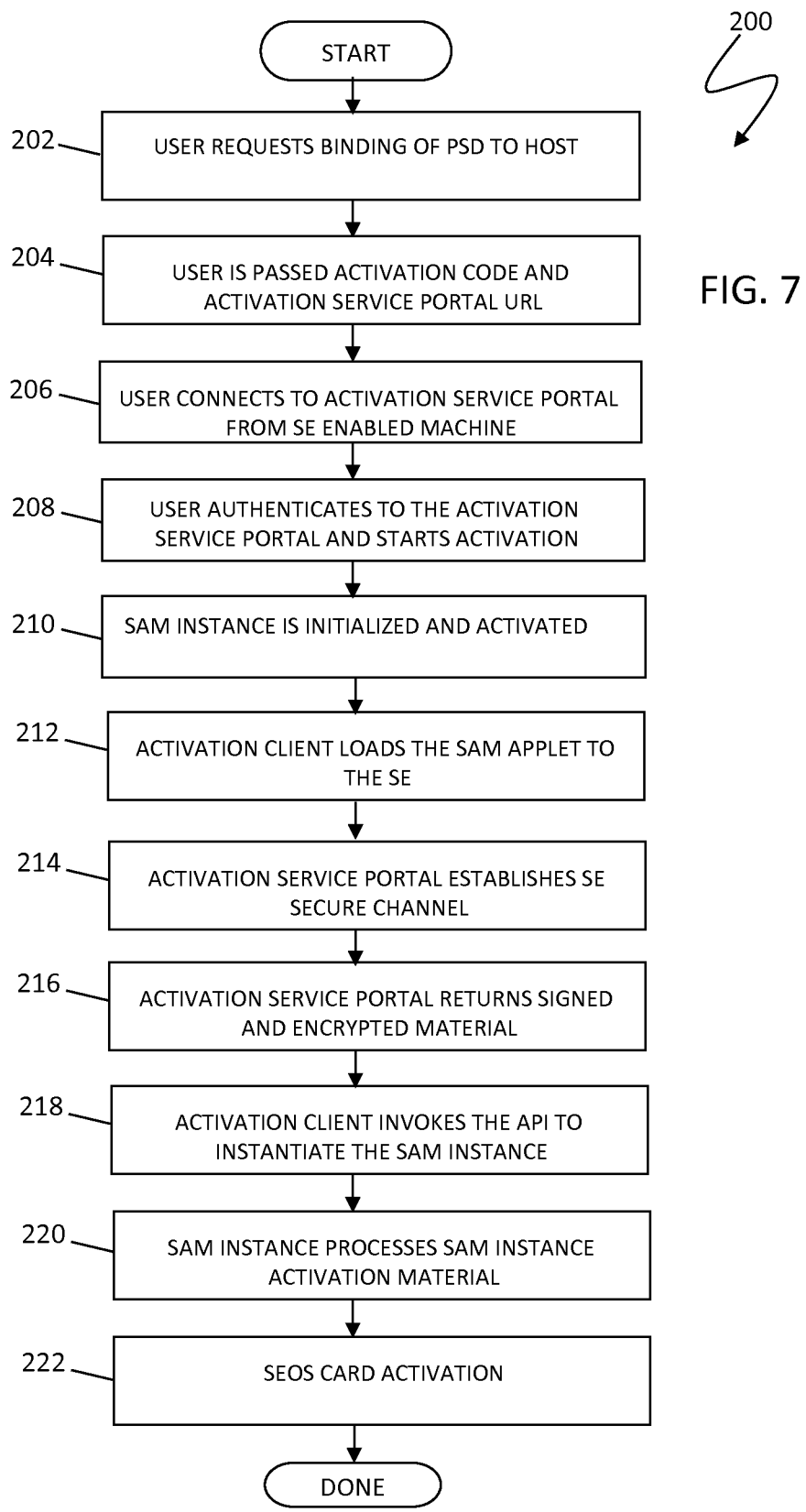
FIG. 7 is a flow diagram showing initial processing for activation of a PSD, such as a Seos card, according to an embodiment of the system described herein.

FIG. 7 is a flow diagram 200 showing initial processing for activation of a PSD, such as a Seos card, according to an embodiment of the system described herein. At a step 202, a user requests binding of his/her PSD (e.g., Seos card) to a host (e.g. desktop/laptop). After the step 202, at a step 204, the user is passed an activation code and activation service portal URL. After the step 204, at a step 206, the user connects to the activation service portal from their SE enabled machine. In various embodiments, an SE enabled machine may include a hardware SAM or may include only the deployment of software to the machine. After the step 206, at a step 208, the user authenticates to the activation service portal and starts activation. After the step 208, at a step 210, a SAM instance is initialized and activated. After the step 210, at a step 212, the activation client loads the SAM applet to the SE. After the step 212, at a step 214, the activation service portal establishes an SE secure channel with the SE. After the step 214, at a step 216, the activation service portal returns signed and encrypted SAM instance activation material through the SE secure channel. After the step 216, at a step 218, the activation client invokes the API to instantiate the SAM instance. After the step 218, at a step 220, the SAM instance processes SAM instance activation material. After the step 220, at a step 222, Seos card activation is performed in one of two modes: tethered mode or roaming mode that are each further described elsewhere herein.

Figure 8:
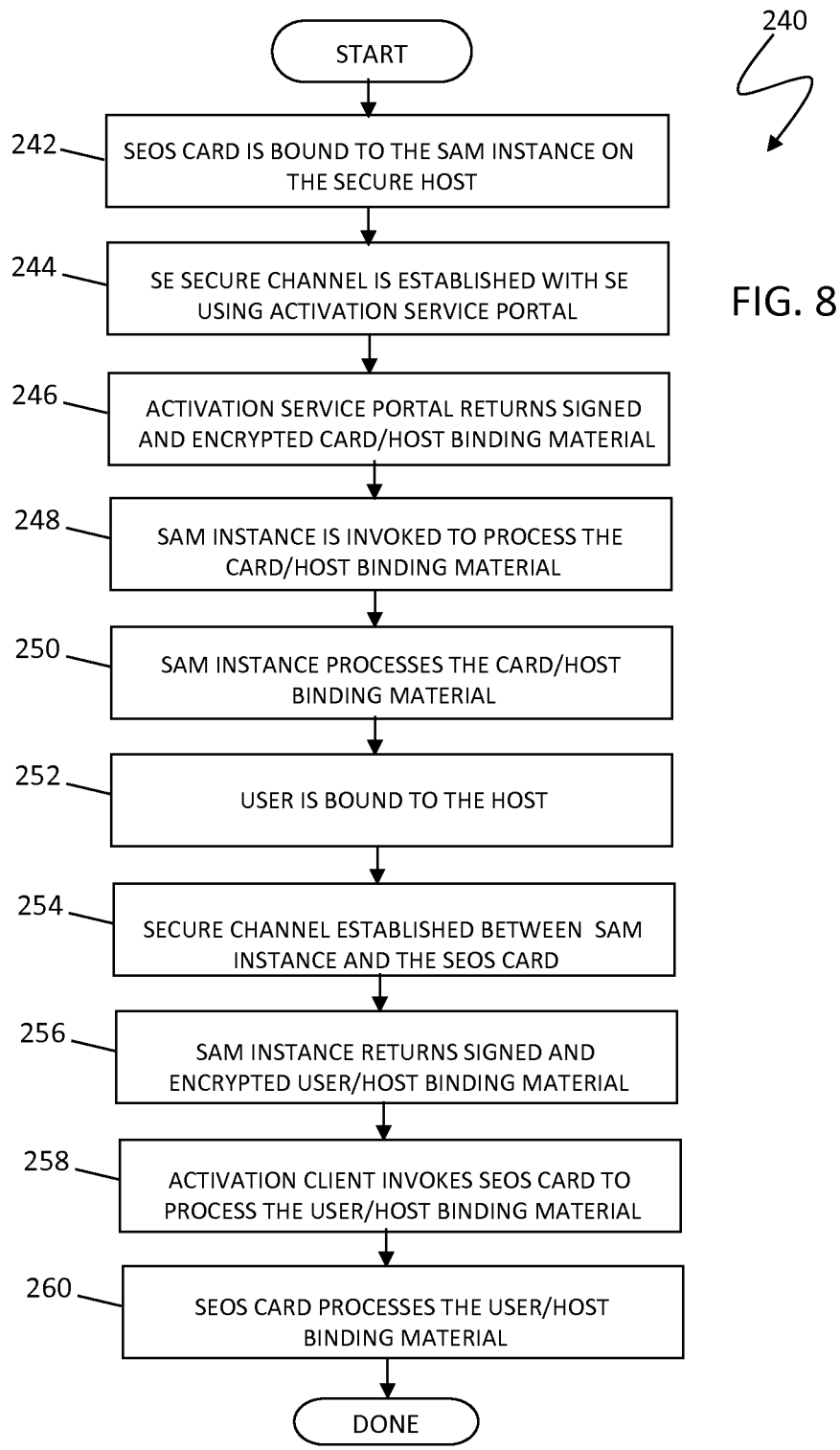
FIG. 8 is a flow diagram showing processing for tethered mode activation of the Seos card according to an embodiment of the system described herein.

FIG. 8 is a flow diagram 240 showing processing for tethered mode activation of the Seos card according to an embodiment of the system described herein. At a step 242, the Seos card (and/or other appropriate type of PSD) is bound to the SAM instance on the secure host. After the step 242, at a step 244, an SE secure channel is established with the SE using the activation service portal. After the step 244, at a step 246, the activation service portal returns signed and encrypted card/host binding material is returned in secure messaging. After the step 246, at a step 248, the SAM instance is invoked to process the card/host binding material. After the step 248, at a step 250, the SAM instance processes the card/host binding material. After the step 250, at a step 252, the user is bound to the host, and may optionally include using a PIN. After the step 252, at a step 254, the activation client establishes an SE secure channel between the SAM instance and the Seos card to deliver the user/host binding material. After the step 254, at a step 256, the SAM instance returns signed and encrypted user/host binding material. After the step 256, at a step 258, the activation client invokes the Seos card to process the user/host binding material. After the step 258, at a step 260, the Seos card processes the user/host binding material. After the step 260, processing is complete.

Figure 9:
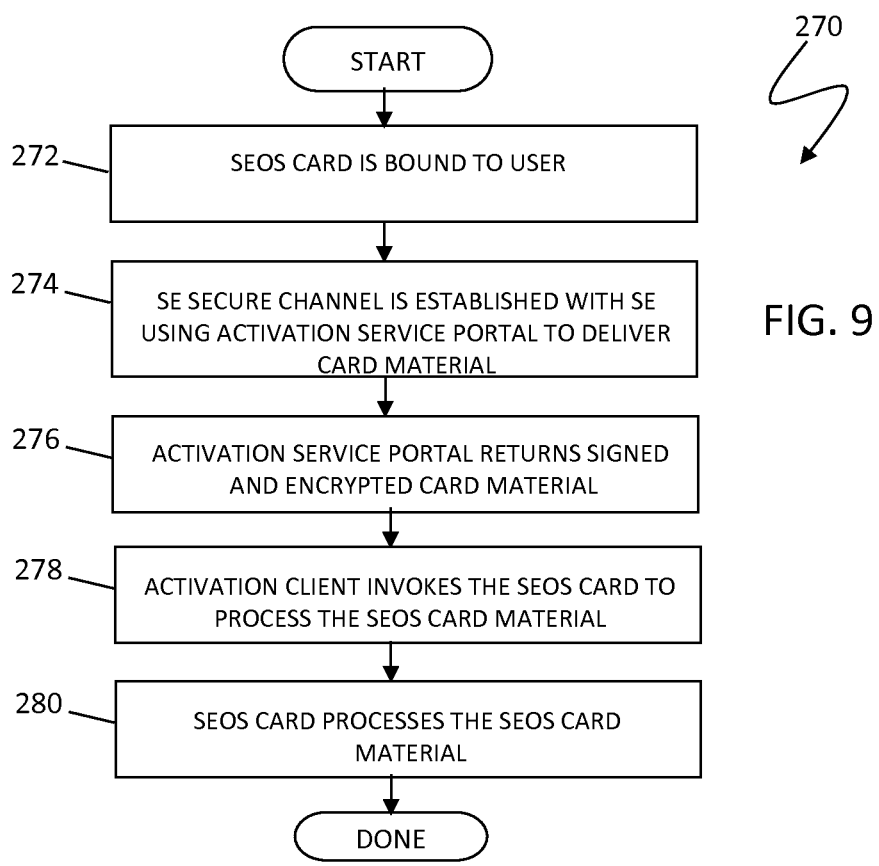
FIG. 9 is a flow diagram showing processing for roaming mode activation of the Seos card according to an embodiment of the system described herein.

FIG. 9 is a flow diagram 270 showing processing for roaming mode activation of the Seos card according to an embodiment of the system described herein. At a step 272, the Seos card is bound to the user, and may optionally include using a PIN. After the step 272, at a step 274, a Seos secure channel is established with the Seos card to deliver card material using the activation service portal. After the step 274, at a step 276, the activation service portal returns signed and encrypted Seos card material. After the step 276, at a step 278, the activation client invokes the Seos card to process the Seos card material. After the step 278, at a step 280, the Seos card processes the Seos card material. After the step 280, processing is complete.

Figure 10:
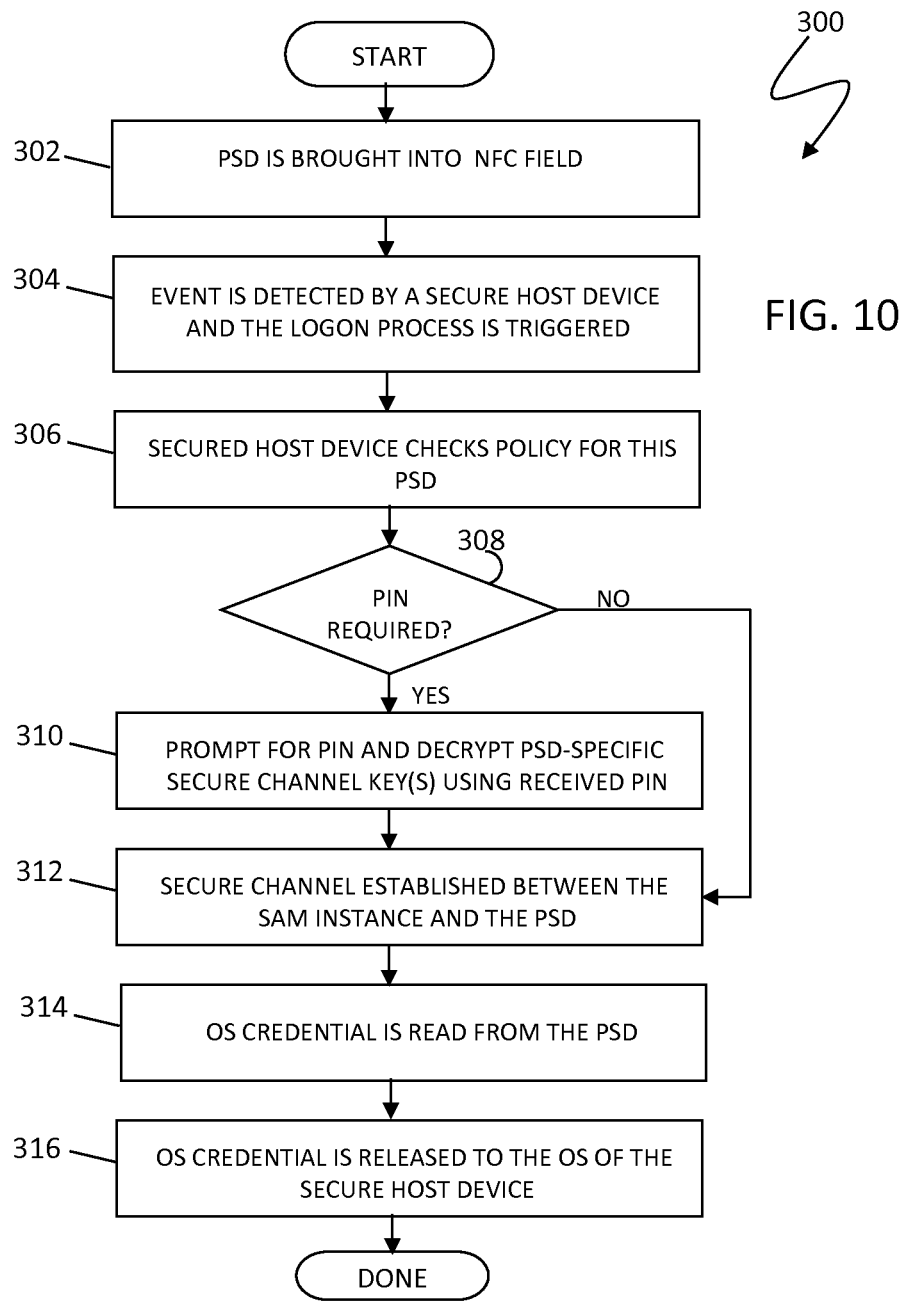
FIG. 10 is a flow diagram showing processing for usage of the system described herein in tethered mode according to an embodiment of the system described herein.

FIG. 10 is a flow diagram 300 showing processing for usage of the system described herein in tethered mode according to an embodiment of the system described herein. At a step 302, a PSD, such as a Seos card, is brought into an NFC field of a card reader. After the step 302, at a step 304, the event is detected by a secure host device and the logon process is triggered. After the step 304, at a step 306, the secure host device checks policy for the PSD. After the step 306, at a test Step 308, it is determined if a PIN is required. If so, then at a step 310, the secure host device prompts for the PIN and decrypts the PSD-specific secure channel key(s) using the received PIN. After step 310, or after test step 308 if no PIN is required by policy, then processing proceeds to a step 312 where a secure channel is established between the SAM instance on the secure host device and the PSD. After the step 312, at a step 314, the OS credential is read from the PSD. After the step 314, at a step 316, the OS credential is released to the OS of the secure host device. After the step 316, processing is complete.

Figure 11:
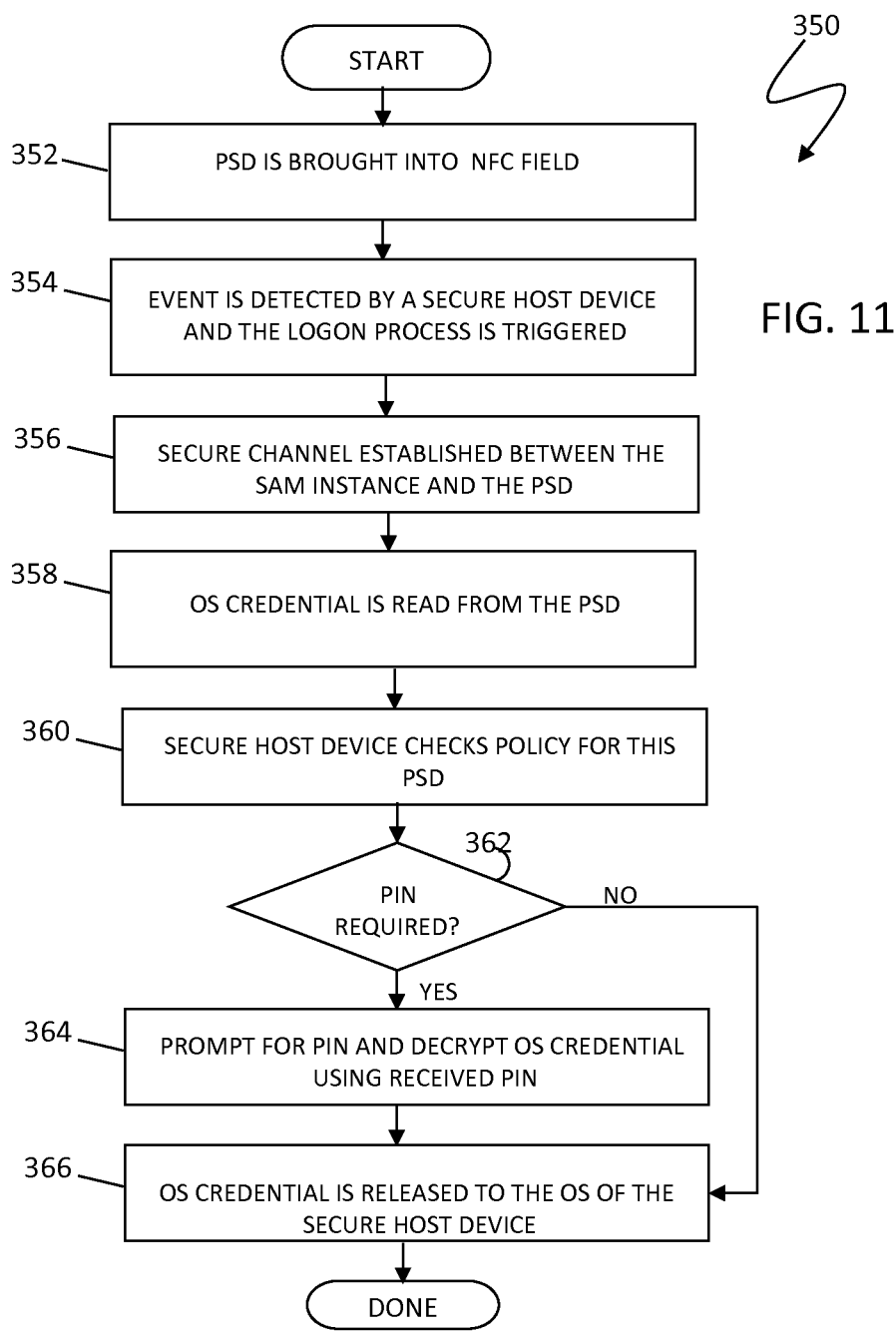
FIG. 11 is a flow diagram showing processing for usage of the system described herein in roaming mode according to an embodiment of the system described herein.

FIG. 11 is a flow diagram 350 showing processing for usage of the system described herein in roaming mode according to an embodiment of the system described herein. At a step 352, a PSD, such as a Seos card, is brought into an NFC field of a card reader. After the step 352, at a step 354, the event is detected by a secure host device and the logon process is triggered. After the step 354, at a step 356, a secure channel is established between the SAM instance on the secure host device and the PSD. After the step 356, at a step 358, the credential is read from the PSD. After the step 358, at a step 360, the secure host device checks policy for this PSD. After the step 360, at a test step 362, it is determined if a PIN is required. If so, then at a step 364, the secure host device prompts for the PIN and decrypts the credential using the received PIN. After step 364, or after step 362 if no PIN is required by policy, then processing proceeds to a step 366 where the credential is released to the OS of the secure host device. It is noted that releasing After the step 366, processing is complete.

Figure 12:
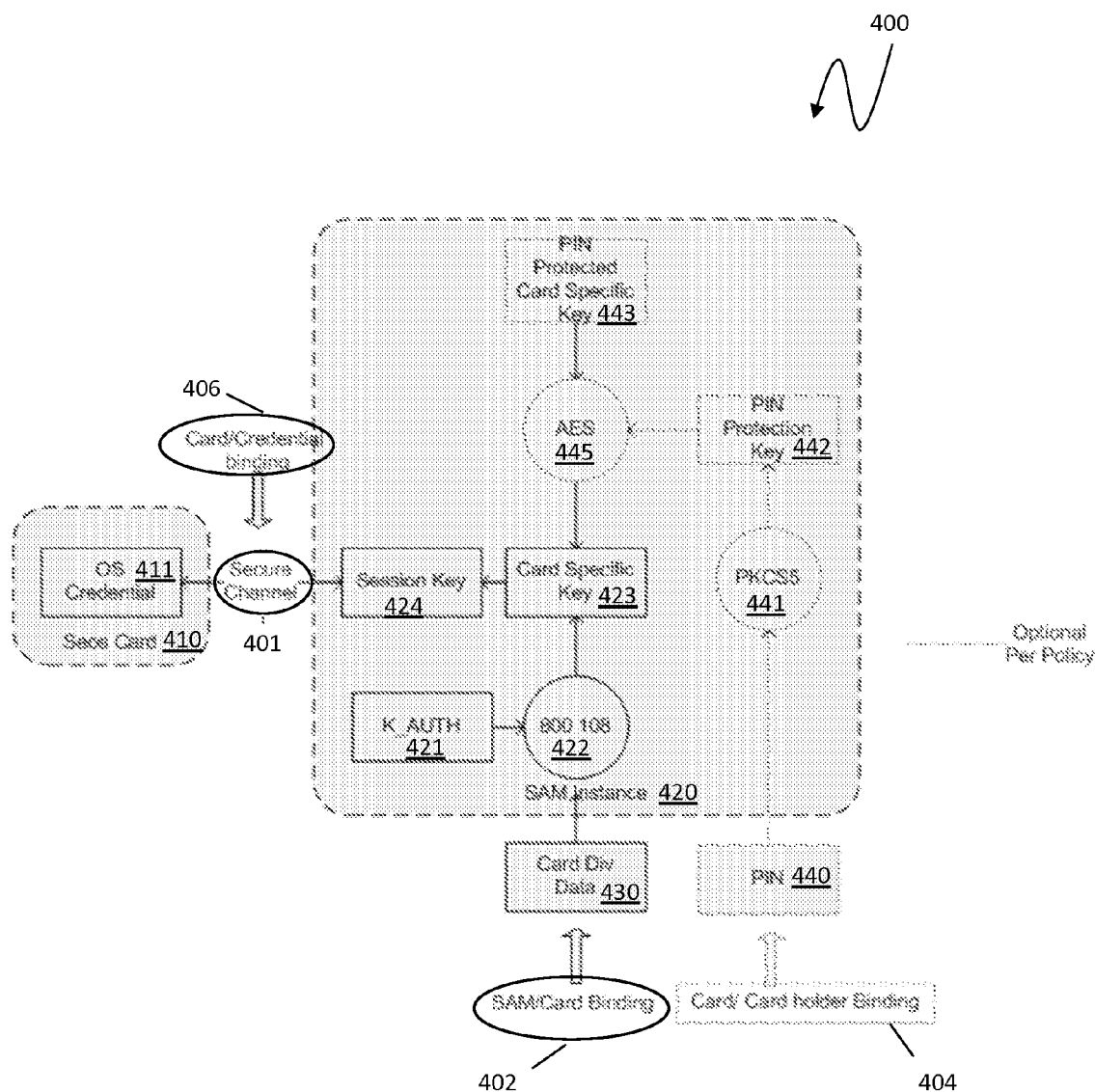
FIG. 12 is schematic illustration showing a tethered mode security model according to an embodiment of the system described herein.

FIG. 12 is schematic illustration showing a tethered mode security model 400 according to an embodiment of the system described herein. Seos card/SAM instance binding 402 is based on card-specific derived keys shared between the Seos card 410 and SAM instance 420. At SAM instance activation time, the SAM instance 420 is provisioned, via a module (800-108) 422, with a Seos master key (K_AUTH) 421 (for secure logon to the Application Development Framework (ADF) of the Seos). The SAM instance 420 is securely provisioned, via the module 422, with diversification data for the particular card (Card Div Data 430) permitting the Seos card 410 to be used in establishment of a Seos secure channel 401 with the SAM instance 420. Using the master key 421 and the diversification data 430, a card-specific key 423 is derived at the module 422, and reference is made, for example, to NIST Special Publication 800-108, "Recommendation for Key Derivation Using Pseudorandom Functions," October 2009, which is incorporated herein by reference.

In an alternative tethered mode security model, the SAM instance authorizes activation of the Seos card 410 without requiring establishment of the SE secure channel 401 with the secure host. The policy to accept any Seos card registration is pushed at SAM instance activation time.

For optional Seos card/card holder binding 404, the Seos card 410 may be bound with a user (card holder) using a PIN 440, although use of the PIN 440 may be optional and defined by policy, such as a requirement for two factor authentication. User/Seos card binding insures that only the legitimate user can successfully establish a session with his/her card and is achieved through user PIN presentation. The SAM instance 420 is responsible to derive a PIN protection key 442 via an algorithm 441, such as a PKCS5 algorithm, and then use the key 442 to decrypt a PIN protected card-specific derived key 443, at a module (AES encryption module) 445, to yield the card-specific key 423. In an embodiment, for SAM instance/Host binding, the resulting card-specific derived key(s) may be further protected by SE native security mechanisms, and this insures that the SAM key are only available to the SE of that specific host and cannot be cloned.

For Seos card/OS credential binding 406, the OS credential may optionally be off-PSD protected by being stored in a secure identity object (SIO) providing off-PSD privacy and integrity. The OS credential may be a static password but any other credential supported by the OS or target application, and usage middleware can be protected in the same manner. For example, as discussed elsewhere herein, the OS credential may be a dynamic OTP. The Seos card may contain a specific ADF dedicated to store OS credentials. The ADF may contain a specific user object protected by Seos secure channel for read and write. The user object may contain the SIO which contains an OS credential secure object (SO) that is only accessible after successful SE secure channel 401 establishment with corresponding card-specific derived key. Given that ultimately the credential is normally returned in the clear to the platform OS there is typically no added security value that the SIO/SO is encrypted or signed. When parsing the SIO the client can just read the SO value ignoring the signature.

Figure 13:
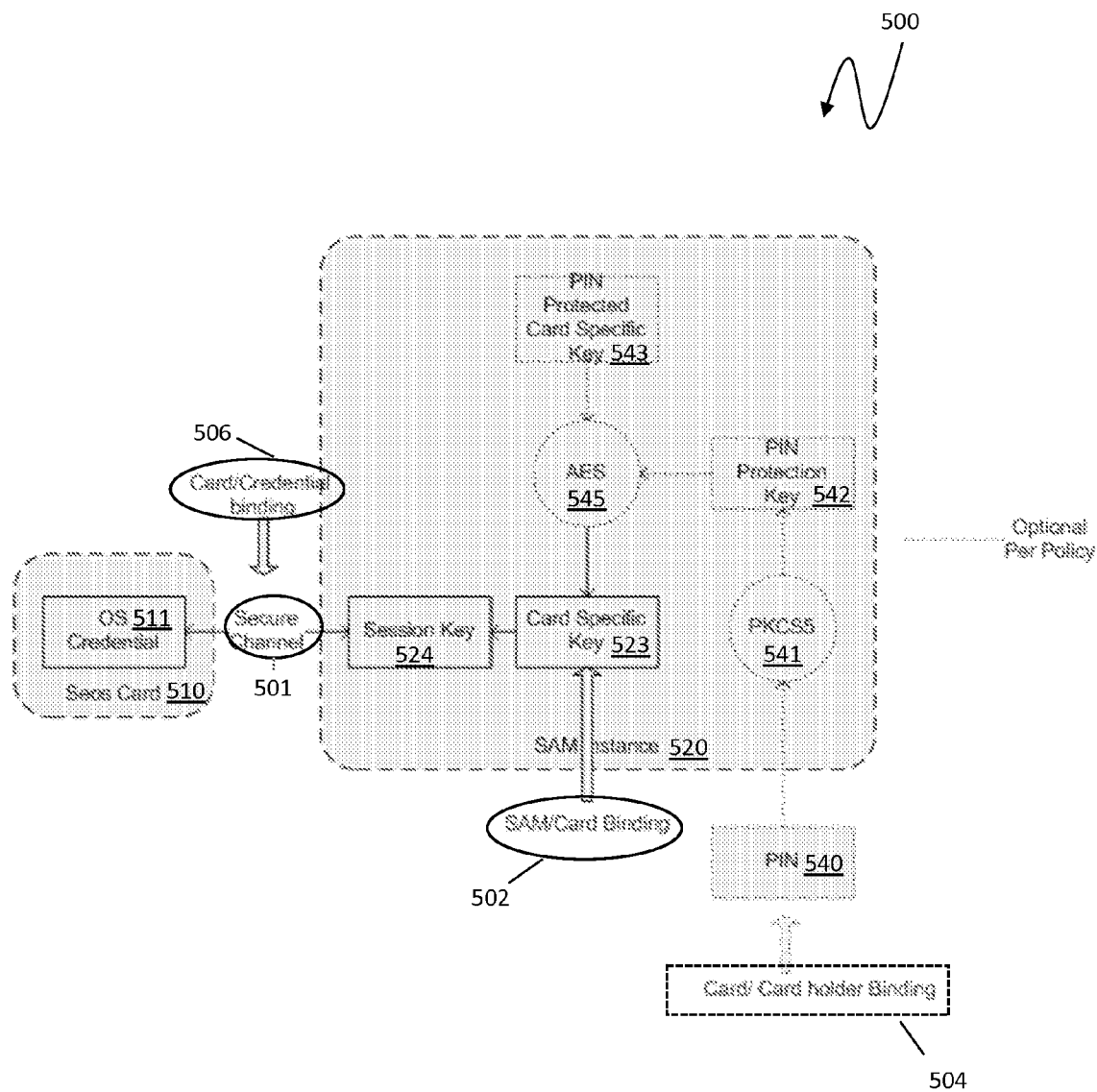
FIG. 13 is an alternative tethered mode security model with self binding according to an embodiment of the system described herein.

FIG. 13 is an alternative tethered mode security model 500 according to an embodiment of the system described herein. In the figure, similar components as the model 400 are shown but beginning with the number "5"; however, with the model 500, instead of provisioning Seos master key during SAM activation it is possible to only provision the Seos card-specific diversified keys during card activation. It is noted that in this variation, the tethered mode security model 500 is a particularly secure model since that master key never leaves the Seos/SAM activation service 112. If the SE is compromised, only Seos cards bound to that SE are considered compromised, rather than all the Seos card population. There is no need to have a separate activation step to provision the Seos master key. This model, however, does not consider self-binding and no-binding use cases.

Figure 14:
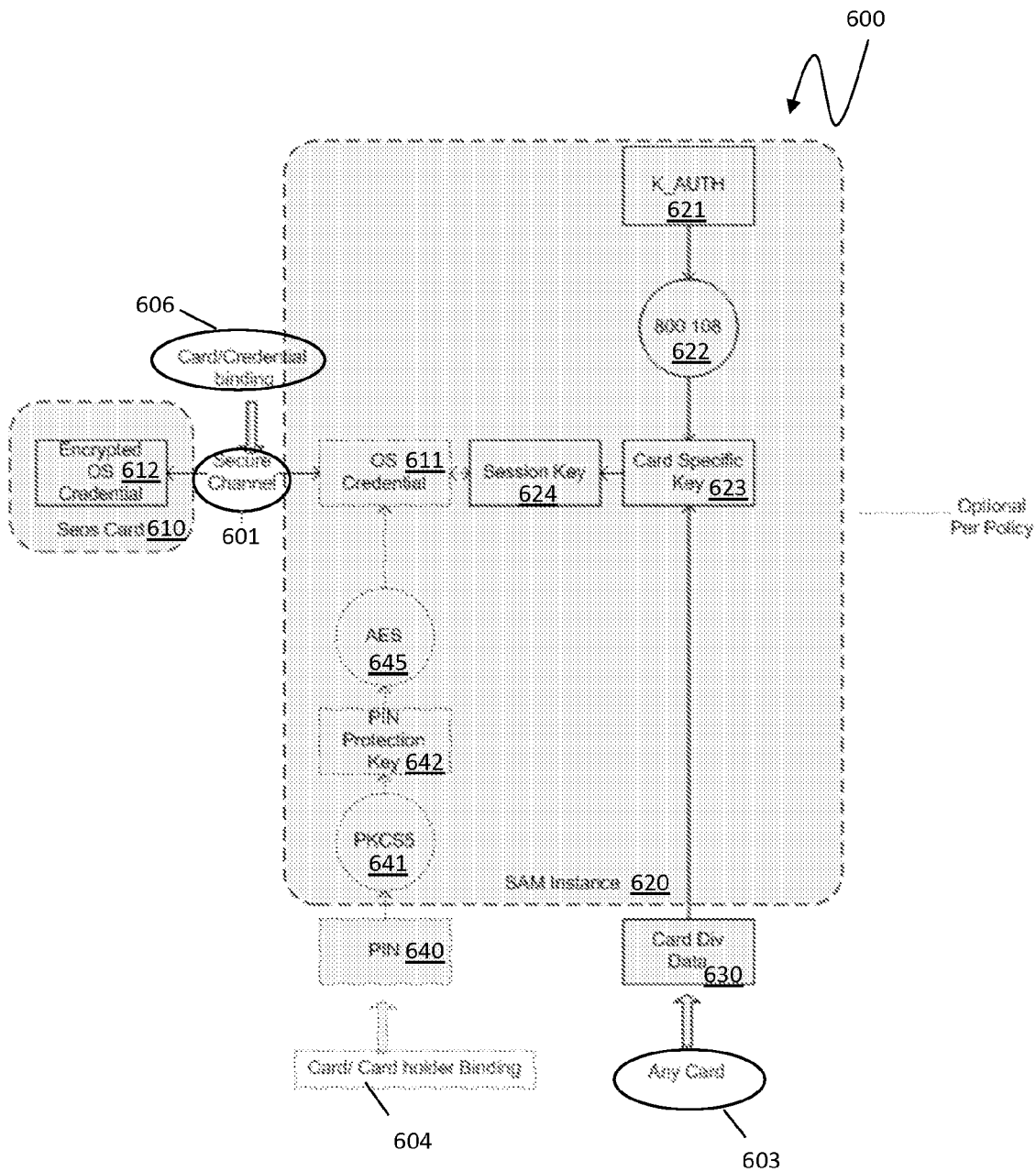
FIG. 14 is a roaming mode security model according to an embodiment of the system described herein.

FIG. 14 is a roaming mode security model 600 according to an embodiment of the system described herein. The model 600 is similar to the model 400 but with the following described alterations, and, unless otherwise noted, identified elements of the model 600 are similar to their counterparts discussed in connection with the model 400, but beginning with the number "6". The user provisions their Seos card 610 once with the OS credential 611 and PIN 640. Any host with the SAM instance 620 activated, authorizes the user to logon as long as the OS credential 611 is valid. This implies the following: no Seos card/SAM instance binding, and the SAM instance 620 authorizes establishment of the Seos Secure Channel 601 with any Seos card 603 without prior registration of the Seos card diversification data and PIN to the SAM instance 620. The policy to accept any Seos card 603 is pushed at SAM instance activation time. For Card/OS credential binding 606, access to the ADF remains protected by the SE secure channel 601. For Card/User binding 604, to preserve two factor authentication, a PIN derived key derived via a PKCS#5 algorithm may be used to encrypt the OS credential 611, to provide an encrypted OS credential 612, prior to injection into the Seos card 610 via the Seos secure channel 601.

In connection with policy management according to the system described herein, it is noted that the binding policy choice may be made at SAM instance activation-time and securely pushed to the newly instantiated SAM instance via the SE secure channel. The policy may encompass SAM/Seos card binding, including authority-driven Seos card/SAM instance binding; self-driven Seos card/SAM instance binding (alternative 1) and/or no Seos card/SAM instance binding (alternative 2). The policy may encompass, for card/user binding model: requiring second factor (e.g., PIN and/or biometric) and/or nor requiring second factor. The policy choice may be set per SAM/Host to allow matching the security level required to access the host in question. The same user can access different machines configured with different policies. For example, for a dedicated desktop in a controlled area, a user registers to an operator to activate their card to access the host and a PIN (and/or a biometric) is presented. For a shared workstation in controlled area, SAM instance authorizes self-binding with PIN upon first use. For a shared workstation in public area, SAM authorizes with no PIN, and no binding may be required for any Seos card with a valid OS credential. It should also be noted that the choice of policy may also impact the card provisioning workflows, specifically either: inject in-clear OS credential in the Seos card (tethered modes) and/or inject PIN protected OS Credential in the Seos card (roaming mode).

It is noted that the system described herein may also be used to protect other credentials or secret used to generate credentials for other use cases than OS logon. For example, it is possible to use the system described herein to protect secrets needed to generate an OTP that can then be used to connect to a protected VPN application.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with other computers and/or with a user. Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for accessing a secure host device using a personal security device (PSD) of a user, comprising:
   providing the PSD with a credential for accessing the secure host device, wherein the credential is only readable from or operable with the PSD when a secure channel is established between the PSD and the secure host device after presenting the PSD in a non-contact field of a reader monitored by the secure host device, wherein the secure host device includes a secure access module (SAM);
   establishing the secure channel with the PSD using keys stored and operated on the secure host device, wherein the establishing of the secure channel is performed in at least one of: a tethered mode of operation or a roaming mode of operation, wherein, for the tethered mode of operation, the PSD releases the credential to the secure host device only when the PSD is cryptographically bound to the secure host device, and, wherein, for the roaming mode of operation, the PSD releases the OS credential to any secure host device activated for a specific group of PSDs; and
   securely releasing the credential of the PSD to a requesting component of the secure host device to achieve access by the user to the secure host device when the PSD is presented in the non-contact field.

2. The method according to claim 1, wherein the requesting component is an operating system (OS) of the secure host device, and wherein the credential is an OS credential.

3. The method according to claim 1, wherein the requesting component is an application running on the secure host device.

4. The method according to claim 1, wherein the credential is a one-time password.

5. The method according to claim 1, wherein the PSD is at least one of: a smart card, a tag, a wearable, or a mobile terminal.

6. The method according to claim 1, wherein the SAM runs on at least one of: dedicated secure hardware of the secure host device or a main processor of the secure host device.

7. The method according to claim 1, further comprising:
   binding the PSD to the user to provide two factor authentication.

8. A non-transitory computer readable medium storing software for accessing a secure host device using a personal security device (PSD) of a user, the software comprising:
   executable code that stores on the PSD a credential for accessing the secure host device, wherein the credential is only readable from or operable with the PSD when a secure channel is established between the PSD and the secure host device after presenting the PSD in a non-contact field of a reader monitored by the secure host device, wherein the secure host device includes a secure access module (SAM);
   executable code that establishes the secure channel with the PSD using keys stored and operated on the secure host device, the executable code that establishes the secure channel including at least one of: executable code that provides a tethered mode of operation or executable code that provides a roaming mode of operation, wherein, for the tethered mode of operation, the PSD releases the credential to the secure host device only when the PSD is cryptographically bound to the secure host device, and, wherein, for the roaming mode of operation, the PSD releases the OS credential to any secure host device activated for a specific group of PSDs;

executable code that securely releases the credential of the PSD to a requesting component of the secure host device to achieve access by the user to the secure host device when the PSD is presented in the non-contact field.

9. The non-transitory computer readable medium according to claim 8, wherein the requesting component is an operating system (OS) of the secure host device, and wherein the credential is an OS credential.

10. The non-transitory computer readable medium according to claim 8, wherein the requesting component is an application running on the secure host device.

11. The non-transitory computer readable medium according to claim 8, wherein the credential is a one-time password.

12. The non-transitory computer readable medium according to claim 8, wherein the PSD is at least one of: a smart card, a tag, a wearable, or a mobile terminal.

13. The non-transitory computer readable medium according to claim 8, wherein the SAM runs on at least one of: dedicated secure hardware of the secure host device or a main processor of the secure host device.

14. The non-transitory computer readable medium according to claim 8, further comprising:

executable code that binds the PSD to the user to provide two factor authentication.

15. A device that accesses a secure host device using a personal security device (PSD) of a user, the device comprising:

a non-contact field reader monitored by the secure host device; and at least one processor that reads software stored on at least one computer readable medium, the software comprising:

executable code that stores on the PSD a credential for accessing the secure host device, wherein the credential is only readable from or operable with the PSD when a secure channel is established between the PSD and the secure host device after presenting the PSD in the non-contact field of the reader monitored by the secure host device, wherein the secure host device includes a secure access module (SAM);

executable code that establishes the secure channel with the PSD using keys stored and operated on the secure host device, the executable code that establishes the secure channel including at least one of: executable code that provides a tethered mode of operation or executable code that provides a roaming mode of operation, wherein, for the tethered mode of operation, the PSD releases the credential to the secure host device only when the PSD is cryptographically bound to the secure host device, and, wherein, for the roaming mode of operation, the PSD releases the OS credential to any secure host device activated for a specific group of PSDs;

executable code that securely releases the credential of the PSD to a requesting component of the secure host device to achieve access by the user to the secure host device when the PSD is presented in the non-contact field.

16. The device according to claim 15, wherein the PSD is at least one of: a smart card, a tag, a wearable, or a mobile terminal., and wherein the secure host device includes a secure access module.

* * * * *